United States Patent [19]
Scheerer

[11] 3,793,996
[45] Feb. 26, 1974

[54] ROTARY COMBUSTION ENGINE WITH IMPROVED FIRING SYSTEM

[75] Inventor: Arthur M. Scheerer, Sarasota, Fla.

[73] Assignee: Curtiss-Wright Corporation, Wood Ridge, N.J.

[22] Filed: July 18, 1972

[21] Appl. No.: 272,854

[52] U.S. Cl............................. 123/8.09, 123/162
[51] Int. Cl........................................... F02b 53/12
[58] Field of Search....... 123/8.09, 8.45, 162, 143 R

[56] References Cited
UNITED STATES PATENTS

| | | | |
|---|---|---|---|
| 3,739,753 | 6/1973 | Burley et al. | 123/8.09 |
| 3,245,388 | 4/1966 | Froede et al. | 123/8.09 |
| 1,401,231 | 12/1921 | Anderson | 123/143 R |
| 2,002,114 | 5/1935 | June | 123/162 X |

Primary Examiner—Carlton R. Croyle
Assistant Examiner—Michael Koczo, Jr.
Attorney, Agent, or Firm—Raymond P. Wallace

[57] ABSTRACT

A rotary engine having a special spark plug with a single electrode flush with the inner surface of the trochoidal housing and firing to a selected portion of the rotor surface at approximate times.

9 Claims, 7 Drawing Figures

ROTARY COMBUSTION ENGINE WITH IMPROVED FIRING SYSTEM

BACKGROUND OF THE INVENTION

This invention relates to rotary combustion engines of trochoidal type, and more particularly to the means of firing the combustible fuel and air mixture within the engine chamber.

In trochoidal engines having a two-lobed peripheral housing, the practice in the prior art has been to install the spark plug in a recess in the peripheral housing in the region of the epitrochoidal cusp where maximum compression occurs, that is, on the side of the engine opposite the intake and exhaust ports. Sometimes the spark plug has been disposed on the upstream side of the cusp, before top dead center, and sometimes on the downstream side of the cusp, after top dead center. The upstream location is shown in U.S. Pat. No. 3,261,542 and the downstream location in U.S. Pat. No. 3,456,625.

The chamber is normally fired with some spark advance, that is, before full compression is reached at top dead center, and difficulties have occurred in obtaining complete combustion with either spark plug location. With a plug in the downstream position, firing occurs toward the leading end of the chamber. The flame front in such engines travels in the direction of rotor rotation, and the gas being compressed also has a high velocity in the same direction. With such conditions, firing in the leading end of the chamber may not provide complete combustion at the trailing end, and some unburned fuel components are swept out the exhaust.

When the spark plug is positioned upstream of the cusp, firing occurs somewhat more toward the trailing end of the chamber. However, such firing in a more upstream location may result in combustion not moving forward rapidly enough to exert its full power before the exhaust port opens. In an attempt to overcome these deficiencies, spark plugs have sometimes been installed in both locations and fired separately.

Other difficulties have arisen from the prior art practice of installing spark plugs. They have customarily been positioned in a recess within the rotor housing with only a small aperture communicating with the combustion chamber, since the plug cannot project into the chamber itself, owing to the necessity of having the rotor seals sweep the housing wall. A portion of the compressed fuel and air mixture must therefore pass through the communicating aperture, be fired in the plug recess, and under the pressure of its combustion be discharged through the aperture back into the main chamber to ignite the rest of the charge.

When the engine is operating with a rich mixture it may occur that not all the mixture within the plug recess is burned and discharged through the aperture, since diameter of the recess and its volume are quite large in comparison to the aperture. Such a condition may therefore result in the gradual accumulation of partially burned fuel products within the spark plug recess, with eventual fouling of the plug, especially since the plug is relatively cool, being outside the actual combustion chamber.

When the engine is idling in the hot condition the fuel mixture is very lean and the chamber pressure is also lower. It can then happen that an insufficient quantity of mixture enters the plug recess, owing to the throttling effect of the communicating aperture, and misfiring results, especially if some fouling of the plug has previously occurred.

With any of the arrangements of the prior art a spark of extended duration cannot be effectively provided, because as soon as any portion of the mixture in the plug chamber is ignited it is immediately expelled by its own combustion pressure, and no more can enter until a new chamber comes into position.

SUMMARY

The present invention overcomes the foregoing difficulties by providing a rotary engine having an igniting arrangement whereby sparking takes place in the actual combustion chamber rather than in an auxiliary recess, both the leading end and the trailing end of the chamber can be fired by a single electrical impulse, and the electrode of the spark plug is continually wiped clean of any possible fouling. This is accomplished by providing at least one spark plug having a single electrode flush with the inner surface of the trochoidal housing at a location where the rotor flank closely approaches the housing, and a rotor having in the recess of each working face an elevated ridge congruent with the rotor profile, against which ridge the spark strikes. The ridge may be continuous throughout the length of the recess and sparking may occur along the entire length of the rotor recess, or the ridge may be interrupted in the midportion of the recess so that the spark fires in both end portions of the recess but breaks at the interruption. As the seal at each apex of the rotor crosses the face of the spark plug electrode it is repeatedly wiped so that no fouling may acculate.

It is an object of this invention to provide a trochoidal rotary engine with an improved firing system.

It is another object to provide a rotary engine with means for striking a spark within the combustion chamber.

A further object is to provide a rotary engine with a spark of extended duration.

Yet another object is to provide a rotary engine with a nonfouling spark plug.

Other objects and advantages will become apparent on reading the following specification in connection with the accompanying drawings.

DESCRIPTION OF THE PREFERRED EMBODIMENTS

Figure 1:
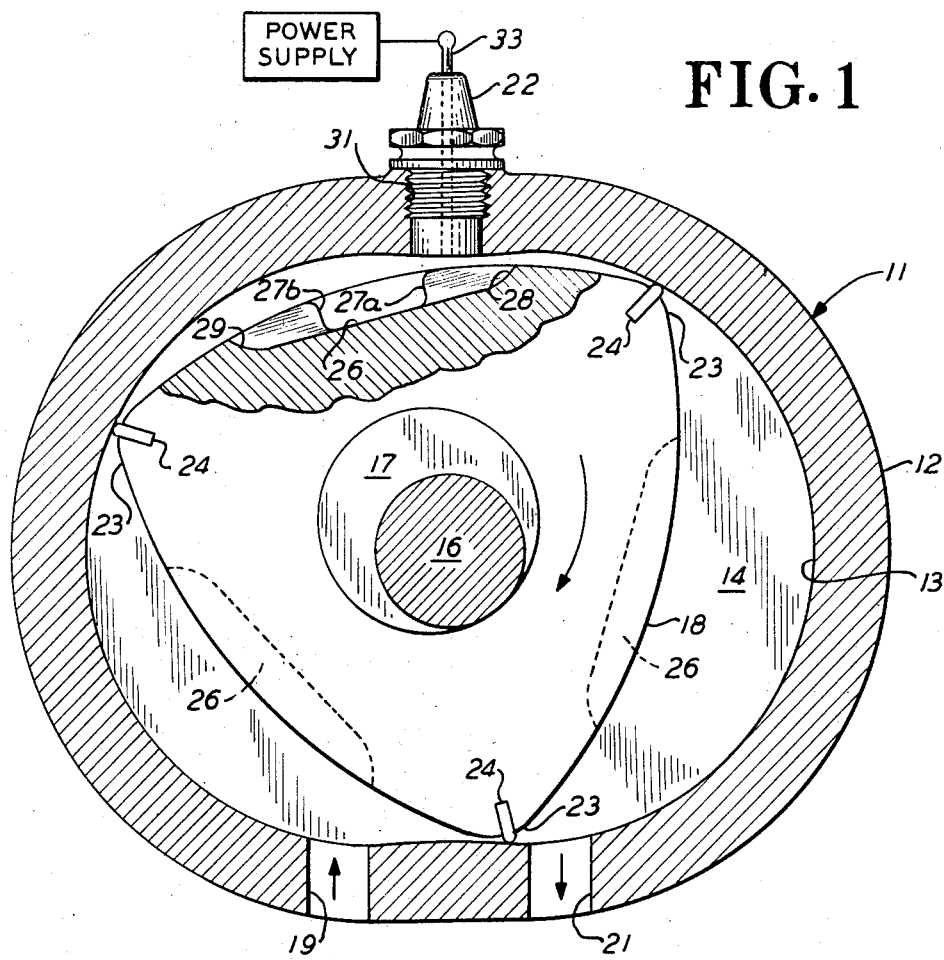
FIG. 1 is a cross-section of a two-lobed epitrochoidal rotary engine embodying the invention.

In FIG. 1 there is shown a cross-section of a rotary engine 11, embodying a peripheral housing 12 having a two-lobed substantially epitrochoidal inner surface 13, parallel end walls 14 of which only the rearmost is shown, a shaft 16 transpiercing the end walls and having an eccentric portion 17 disposed within the engine cavity, and a generally polygonal rotor 18 rotatably mounted on the eccentric. The rotor shown has a generally triangular profile with arcuate sides, which configuration is substantially the inner envelope of the two-lobed epitrochoidal housing shown. For other two-lobed epitrochoids the inner envelope, while remaining generally triangular, will vary somewhat in profile. For epitrochoids having a different number of lobes, the inner envelope will also be generally polygonal and will have one more apex portion than the number of lobes of the epitrochoid.

The engine housing is provided with an intake port 19 and an exhaust port 21, either or both of which may be disposed in the peripheral housing as shown, or in either or both of the end walls. A spark plug 22 (better shown in FIG. 5) is mounted in the peripheral housing at the cusp between the two lobes of the epitrochoid on the side opposite the ports, with its inner end flush with the trochoidal surface 13. An appropriate power supply, being the ignition system of the engine, is connected to the electrode of the spark plug, the remainder of the engine being at ground with respect to the potential supplied to the plug. Each of the rotor apex portions 23 is provided with an apex seal strip 24 sweeping the inner surface 13. Various other sealing elements, bearings, and other appurtenances of such an engine are understood to be present, but not shown here as not being immediately germane to a description of the present invention.

Each of the three rotor flanks or working faces between the apex seals is provided with a recess 26 which assists in determining the compression ratio of the engine, and transfers the gases across the cusp of the epitrochoid.

Figure 2:
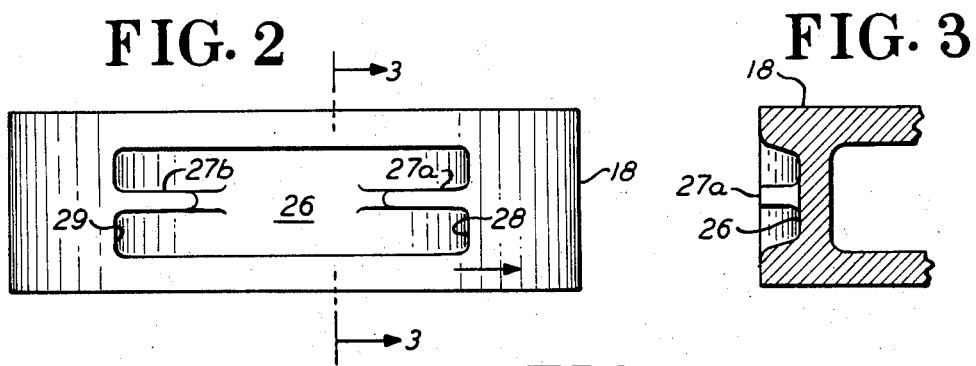
FIG. 2 is a plan view of the working face of the rotor.
Figure 3:
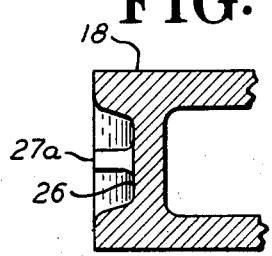
FIG. 3 is a fragmentary cross-section taken on line 3—3 of FIG. 2.
Figure 4:
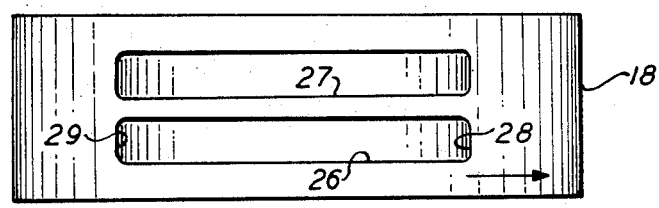
FIG. 4 is a view similar to FIG. 2 of a modified rotor face.

A rib member 27 rises from the floor of the recess to a height equal to that of the side walls of the rotor, the surface of the rib having the same curvature as the surface of the side walls along the rotor flank, so that the rib has the same profile as the rest of the rotor when viewed in a direction parallel to the axis of the shaft 16. Rib 27 may be continuous, as shown in FIG. 4, from the leading end 28 of recess 26 to the trailing end 29. Alternatively, it may be interrupted in the midportion of the recess, as shown in FIG. 3, and have a leading portion 27a and a trailing portion 27b. It is also possible that either the leading portion 27a or the trailing portion 27b may be used alone. The rib in any of its embodiments is disposed approximately centrally between the two side faces of the rotor. Where it is shown interrupted (FIG. 2) in the midportion of the rotor recess, the two portions 27a and 27b have been shown as of approximately equal length, but either portion may be longer than the other as may be appropriate in a given engine design.

The peripheral housing 12 has an aperture 31 therethrough at the cusp of the epitrochoid opposite the intake and exhaust region. Aperture 31 is threaded in a portion of its depth, and has the spark plug 22 seated therein (shown enlarged in FIG. 5). The spark plug has a barrel section 32 which extends through aperture 31 and a single electrode 33 concentric therewith. The electrode is spaced from the barrel and maintained in position by ceramic insulating material 34; alumina, beryllia, silica, titania, and zirconia are satisfactory materials for insulation 34.

Figure 5:
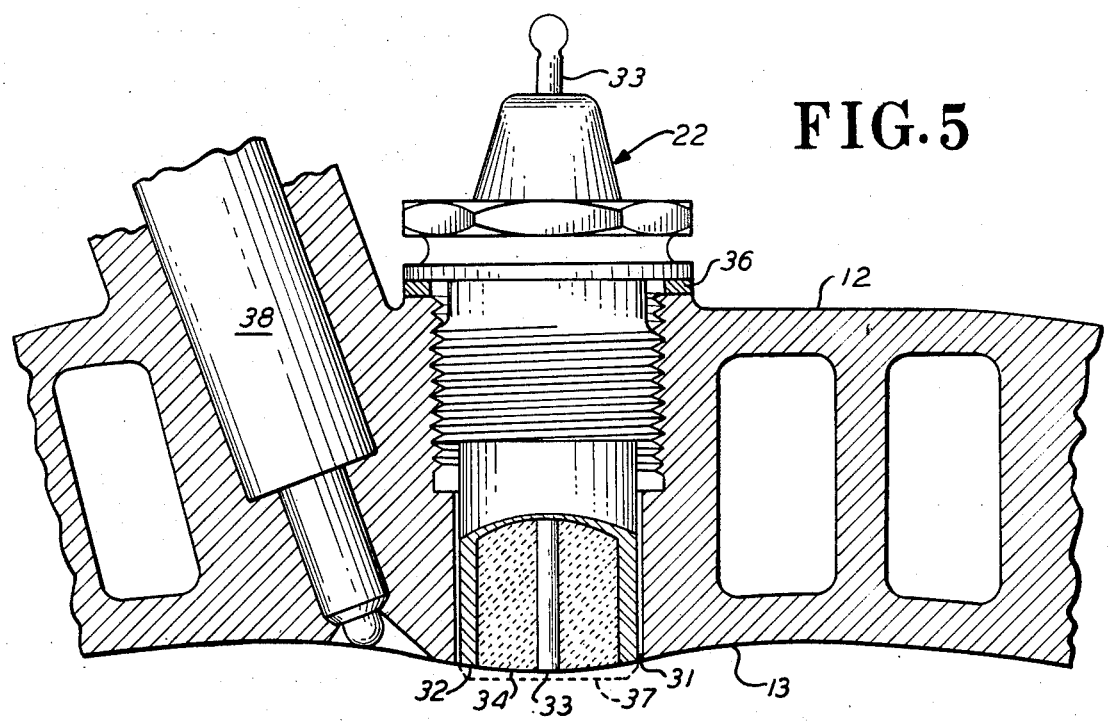
FIG. 5 is an enlarged fragmentary cross-section of the housing and spark plug.

Aperture 31 is located in the peripheral housing midway between the end walls, so that when the spark plug is in place the rib 27 of the rotor will pass directly beneath the electrode. Although the inner end of the aperture is shown in FIG. 5 observably larger than the barrel of the spark plug, for clarity of illustration, the actual difference in diameter need not be great, merely enough so that there will be no binding of the barrel when the plug is screwed down. About 0.010 difference in the two diameters is sufficient.

The spark plug is installed at assembly of the engine, being screwed to a predetermined torque against a permanent gasket 36. The plug is made slightly longer than the wall thickness, so that a small portion 37 indicated by dash lines projects from the inner surface of the housing wall after the plug is screwed down. The projecting portion 37 is then ground off smoothly to the contour of the trochoid at that point, leaving a smooth surface to be swept by the apex seals.

As will be seen from FIG. 1, the rotor working face of the compression chamber very closely approaches the cusp of the epitrochoid as the leading apex of the compression chamber passes the cusp, and approximately the same spacing between the cusp and the rotor face is maintained until the trailing apex passes. The actual gap between the spark plug electrode and the surface of the rotor working face varies somewhat with the size of the engine, but is usually such that a spark can be readily fired thereacross. For example, in engines of approximate automotive size the gap may be from about 0.015 to about 0.030. Although it may be somewhat greater in larger engines, it is such as can be bridged by an appropriate potential supplied to the electrode. The spark plug is of such diameter, of course, that the electrode cannot fire to the barrel of the plug. The fuel and air mixture is normally fired before maximum compression is reached, that is, somewhat before the rotor face reaches top dead center. In the embodiment of FIG. 1 an electrical impulse to the spark plug electrode may be timed to begin as the leading end 28 of the recess 26 passes beneath the electrode, and a spark strikes between the electrode and rib 27, which of course is at opposite polarity from the electrode. The electrical impulse may be continued until the trailing end 29 of the recess passes beneath the electrode. As shown, firing to rib portion 27a has nearly been completed. As the trailing end of rib portion 27a passes beneath the electrode, the gap becomes too great for the potential supplied to leap, even though potential is maintained. However, as soon as the leading end of rib portion 27b comes under the electrode the spark will strike again, and continues until termination of the electrical impulse as the trailing end of the recess arrives under the electrode.

Such a mode of operation provides ignition actually within the combustion chamber rather than in an auxiliary recess, and provides two successive sparks, one in the leading portion of the chamber and one in the trailing portion, with only one spark plug and with only one electrical impulse. However, operation is not limited to this mode, since the timing of the electrical impulse may be modified to produce a spark of any desired duration within the chamber, or to fire only one of the rib portions 27a and 27b. Firing to 27b alone may be selected when retarded ignition is desired, such as in cold starting.

The use of a rotor with a continuous rib 27 extending from one end to the other of the rotor recess allows even greater variation of timing of a single impulse. Ignition may be continuous from the leading end to the trailing end of rib 27, or a spark of any desired duration may be struck at any portion of the rib. However, if two successive sparks are desired with a continuous rib, the spark plug must be timed for two separate electrical impulses. The shape and proportion of the rotor recess as shown are for purposes of illustration only, and the recess may be longer, shorter, or deeper, or of nonsymmetrical shape. It may also be displaced toward either the leading or trailing end of the rotor face.

Figure 6:
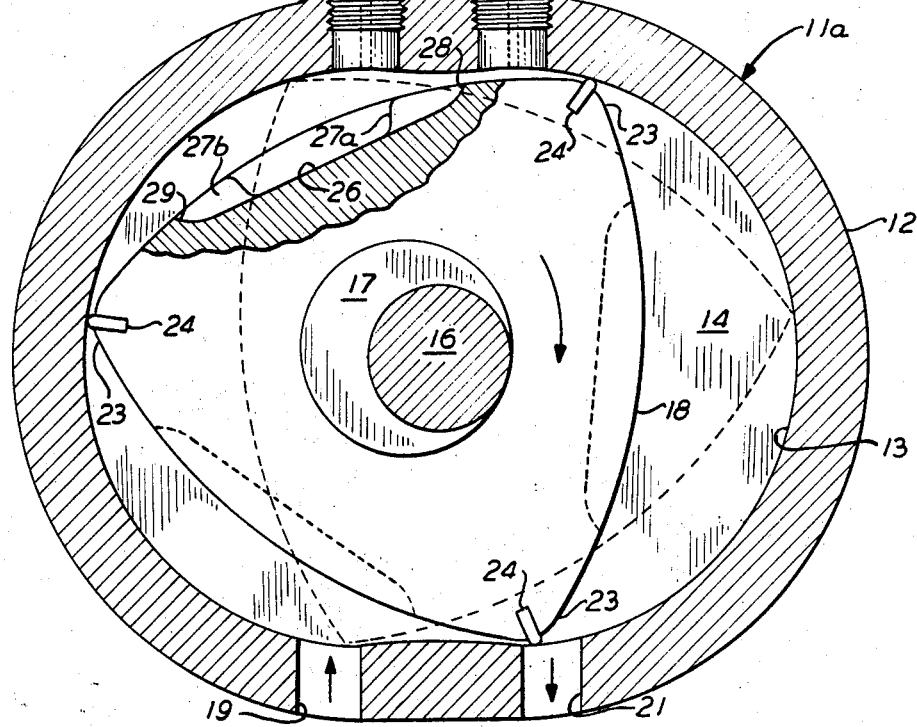
FIG. 6 is a view similar to FIG. 1 of a modified embodiment.

FIG. 6 shows an engine 11a, similar in all respects to that of FIG. 1 except that it is provided with two spark plugs 22 located one on each side of the cusp. It will be observed from the rotor position shown that the leading portion of the rotor face, after the apex portion 23 passes the cusp, remains in close juxtaposition to the curve of the trochoidal surface for a short distance downstream from the cusp. The moved rotor position indicated by dash lines shows that the trailing portion of the chamber will also closely approach the trochoidal surface just upstream from the cusp. consequently, a spark plug 22 installed close to the cusp on either side thereof and having its inner end ground to the curvature of the trochoidal surface will fire to the rotor rib 27. The maximum region in which such spark plugs can be located is with the electrode at about 20°, with the axis of the engine as origin, upstream or downstream from the cusp, and they should preferably be located as close to the cusp as possible.

As shown in FIG. 6, two spark plugs 22 are installed in tandem, one on each side of the cusp and midway between the end walls, with sufficient clearance between them to allow ready installation. The downstream plug is timed to fire at the leading end of the rotor recess, and the upstream plug is timed to fire at the trailing end. This arrangement may be employed with either the continuous rib 27 or the interrupted rib 27a, 27b.

Figure 7:
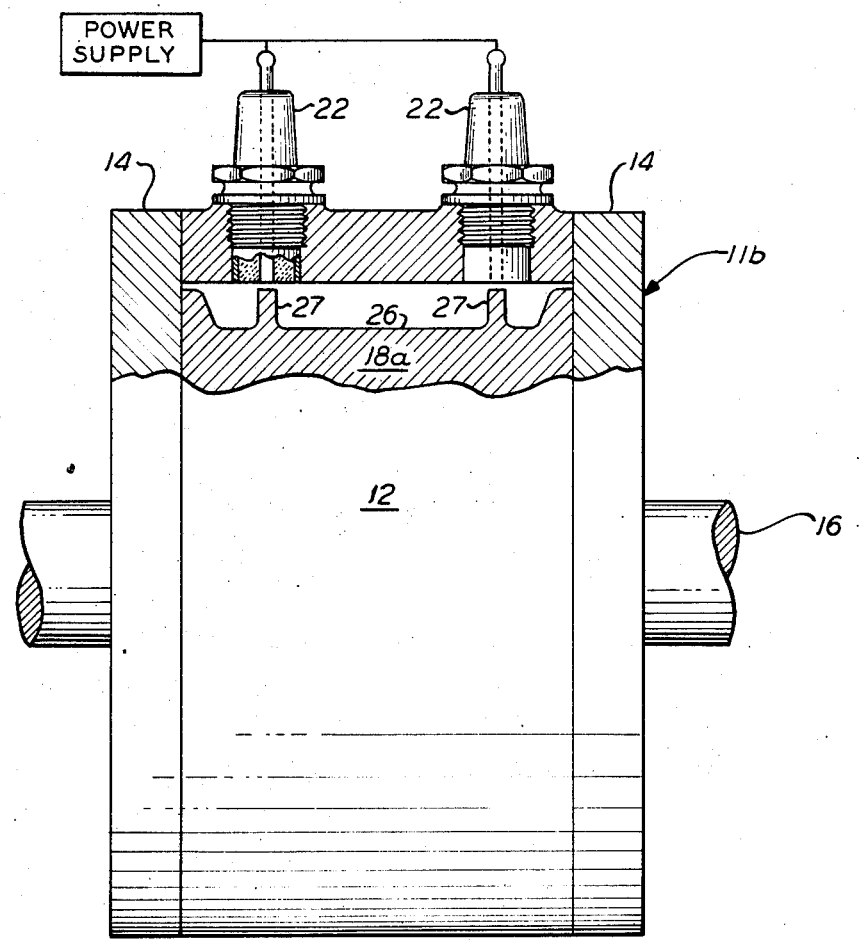
FIG. 7 is an elevation, partially cut away, of a further embodiment.

In engines wherein increased power is desired, it is sometimes convenient to use a rotor of increased width, rather than increased diameter, to gain additional chamber volume. Such an engine 11b with a wide rotor 18a is shown in FIG. 7. In this embodiment the rotor recess 26 has disposed therein two parallel ribs 27, either continuous or interrupted. Two spark plugs 22 are installed side by side at the cusp of the epitrochoid, in line with their respective rotor ribs. This engine is operated in the same way as that of FIG. 1, but with two spark plugs combustion can be initiated more evenly across a wide rotor. The engine of FIG. 7 may also have four spark plugs, installed two beside the cusp in the downstream position, and two in the upstream position, and operated in the manner described for the engine of FIG. 6.

FIG. 5 shows also a means of operating with fuel injection. A fuel injector nozzle 38 is disposed in an appropriate mounting recess in the housing, the injection system being timed to inject fuel into the air charge when compression has reached a desired value. The nozzle 38 as shown is located as close as practicable to the spark plug and disposed at such an angle that a portion of the spray from the nozzle will pass through the spark. However, the nozzle may be otherwise located, subject only to the provision that it will discharge into the compression chamber.

It will be seen from the foregoing description that the invention provides a rotary engine wherein ignition is initiated within the combustion chamber rather than in an auxiliary recess, that a spark of selected duration and at selected portions of the combustion chamber may be produced, and that the repeated wiping of the electrode by the apex seals prevents spark plug fouling. The invention is also applicable to engines having a plurality of rotors disposed in axially aligned cavities.

What is claimed is:

1. A rotary internal combustion engine having a housing comprising a peripheral wall having a substantially epitrochoidal inner surface and a pair of end walls defining an engine cavity and having inlet and outlet ports, a shaft transpiercing the end walls and having an eccentric portion disposed within the engine cavity, a rotor of generally polygonal profile rotatably mounted on the eccentric and having a plurality of apex portions sweeping the inner peripheral surface in sealing relation therewith, the rotor having a plurality of working faces between apex portions, the working faces defining with the housing a plurality of working chambers of variable volume, wherein the improvement comprises:

a. at least one spark plug borne by the peripheral wall and extending therethrough and disposed in the region wherein compression takes place, the spark plug having an inner end face flush with the inner surface of the peripheral wall and having a coaxial electrode exposed to the working chamber at said inner end face, and a power supply connected to the electrode, b. the rotor working face of the compression chamber passing in close juxtaposition to the electrode but separated therefrom by a gap, the rotor being at opposite polarity from the electrode, and c. the power supply being timed to supply an electrical impulse to the electrode to fire a spark across the gap between the electrode and the rotor working face during the time the working face is juxtaposed to the electrode.

2. The combination recited in claim 1, wherein each rotor working face between apex portions has a recess therein elongated in the direction between apex portions, and at least one rib against which the spark strikes disposed in the recess, the rib rising from the bottom of the recess to the same surface level as the working face and having longitudinal extent in the direction between apex portions.

3. The combination recited in claim 2, wherein the rib is continuous and extends from one end of the recess to the other.

4. The combination recited in claim 2, wherein the rib has a portion extending from each end of the recess and is interrupted therebetween.

5. The combination recited in claim 2, wherein the peripheral wall has a two-lobed epitrochoidal inner surface having a cusp at each of the junctions between the lobes, the housing has intake and exhaust ports in the general region of one of said cusps, and at least one spark plug is borne by the peripheral wall in the region of the other cusp.

6. The combination recited in claim 5, wherein the peripheral wall bears a single spark plug positioned at the cusp and approximately midway between the end walls, and each rotor recess has a single rib therein disposed on a line approximately midway between the sides of the rotor in a position to pass under the spark plug in line with the electrode thereof.

7. The combination recited in claim 5, wherein the peripheral wall bears two spark plugs positioned at the cusp and disposed side by side in the axial direction of the engine, and each rotor recess has two ribs therein with each rib disposed to pass under one of the spark plugs in line with the electrode thereof.

8. The combination recited in claim 5, wherein the peripheral wall bears a first spark plug positioned downstream from the cusp and within 20° thereof and approximately midway between the end walls, and a second spark plug positioned upstream from the cusp and within 20° thereof and approximately midway between the end walls, and each rotor recess has a rib therein disposed on a line approximately midway between the sides of the rotor in a position to pass under each of the first and second spark plugs in line with the electrodes thereof.

9. The combination recited in claim 1, wherein the engine housing bears a fuel injection nozzle adjacent to the spark plug discharging a spray of fuel into the compression chamber and so disposed that at least a portion of the spray is discharged into the spark path.

* * * * *